Figure 1:
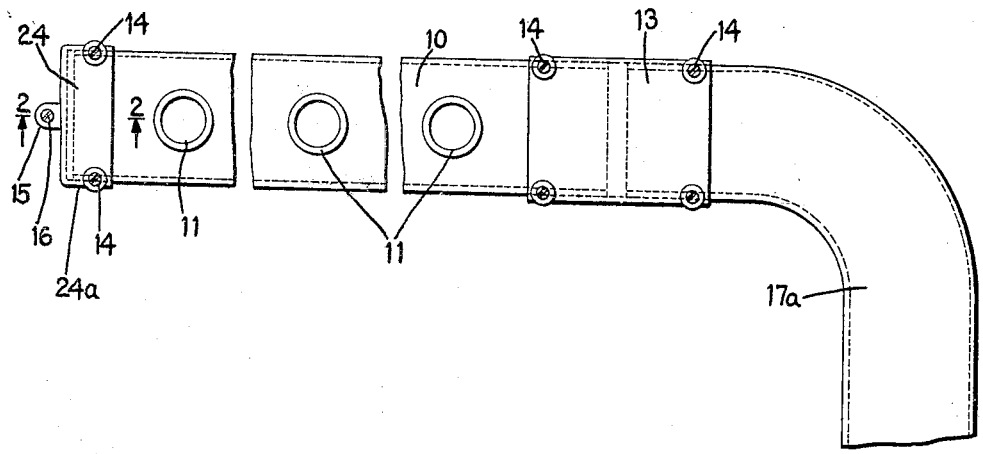

March 22, 1932.  J. M. G. FULLMAN  1,850,794
FITTING FOR ELECTRICAL CONDUIT SYSTEMS
Original Filed May 15, 1929

Inventor
James M. G. Fullman
By his Attorneys
Cooper, Kerr & Dunham

Patented Mar. 22, 1932

1,850,794

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

FITTING FOR ELECTRICAL CONDUIT SYSTEMS

Original application filed May 15, 1929, Serial No. 363,121. Patent No. 1,782,779, dated November 25, 1930. Divided and this application filed February 17, 1930. Serial No. 428,880.

This invention relates to fittings for duct systems and more particularly relates to fittings adapted for use with an underfloor duct system which is generally of the type shown and described in the co-pending application of W. C. Robinson, Serial No. 338,667, filed February 9, 1929. The present application constitutes a division of my co-pending application Serial No. 363,121, filed May 15, 1929.

In the installations of so-called underfloor duct systems it is the practice to first lay the main floor slab or base and then to install thereon the duct system for electrical distribution. The ducts are spaced slightly from and levelled with respect to the main slab and subsequently the ducts are covered with concrete. Frequently one duct must be connected with another and in some cases blind ends of ducts must be sealed off and in other cases elbow connections must be made from ducts running in one direction to other ducts which run at right angles thereto. Sometimes the disposition of the ducts is such that certain duct runs must cross other ducts.

One object of the present invention resides in the provision of a blind end closure which is provided with means of novel form for fastening an adjacent duct section thereto.

Another object of the present invention resides in the provision of a blind end of a closure with means for supporting said closure at an adjustable height above the main floor slab.

Further and other objects of the invention will be hereinafter set forth in the accompanying specification and claims and shown in the drawings which by way of illustration shows a preferred embodiment of the invention.

Figure 2:
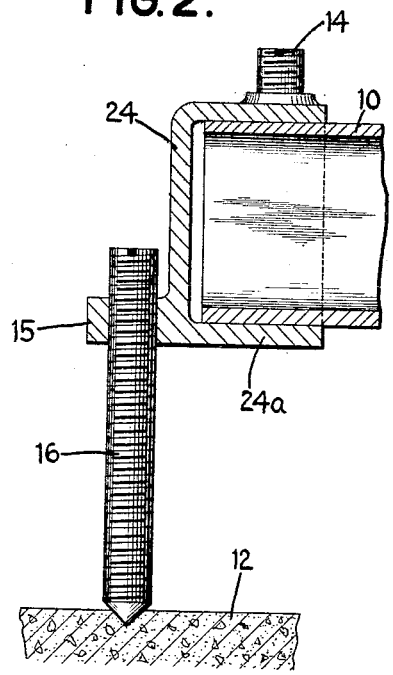

In the drawings:

Figure 1 is a plan view of a fragment of a duct system employing a number of fittings and in which there is provided a blind end closure for blanking off one end of the duct system; and Fig. 2 is a detail sectional view of the blind end closure or cap taken on lines 2—2 of Fig. 1.

In more detail referring to the drawings, 10 represents a section of underfloor duct or conduit provided with integral outlet necks 11. This duct or conduit is shown having at its right hand end a fitting 13 having a female coupling at one end to receive the duct 10 and a coupling on the opposite end to receive conduit section 17a. Duct 10 and section 17a are secured to the connector fitting 13 by means of the set screw 14. The section 17a is an elbow section having its elbow in the plane of the conduit 10. The conduit 10 is shown as having its end opposite from 17a sealed off by a so-called duct end blanking part 24 or blind end closure. Such duct end blanking part 24 includes a female coupling portion 24a and is provided with set screws 14 which engage the duct 10. The part 24 is also provided with an extension 15 adapted to receive a stud 16. By adjusting the stud up and down the blind end closure can be adjusted to any desired height above the supporting floor slab 12. In this way the associated duct system at its end adjacent the blind end closure can be adjusted to the desired height above the main supporting floor slab.

What I claim is:

1. A fitting for a conduit system comprising a part adapted to be fitted to and for blanking off the end of a conduit, said part also having an extension receiving a threaded stud which provides for supporting the part and the conduit which is blanked off thereby at a desired varied height from a supporting floor slab.

2. A fitting for a conduit system comprising a part adapted to be fitted to and for blanking off the end of a conduit, said part having a threaded stud which provides for supporting the part and the conduit which is blanked off thereby at a desired varied height.

In testimony whereof I hereto affix my signature.

JAMES M. G. FULLMAN.